(12) United States Patent
Mizusawa

(10) Patent No.: US 8,456,762 B2
(45) Date of Patent: *Jun. 4, 2013

(54) OBSERVATION OPTICAL SYSTEM

(75) Inventor: Masayuki Mizusawa, Hachioji (JP)

(73) Assignee: Olympus Corporation, Tokyo (JP)

(*) Notice: Subject to any disclaimer, the term of this patent is extended or adjusted under 35 U.S.C. 154(b) by 1439 days.

This patent is subject to a terminal disclaimer.

(21) Appl. No.: 12/099,602

(22) Filed: Apr. 8, 2008

(65) Prior Publication Data

US 2008/0247039 A1   Oct. 9, 2008

(30) Foreign Application Priority Data

Apr. 9, 2007   (JP) ................................. 2007-101803

(51) Int. Cl.
*G02B 17/00*   (2006.01)
*A61B 1/06*   (2006.01)

(52) U.S. Cl.
USPC ........... 359/726; 359/736; 359/750; 600/101; 600/109; 600/160; 600/178

(58) Field of Classification Search
USPC ................ 359/725, 726, 727, 750, 753, 833, 359/834, 736; 600/101, 109, 160, 178
See application file for complete search history.

(56) References Cited

U.S. PATENT DOCUMENTS

| | | | | |
|---|---|---|---|---|
| 3,283,653 A * | 11/1966 | Tokarzewski | ................. | 359/725 |
| 4,626,079 A * | 12/1986 | Nakamura et al. | ............ | 359/387 |
| 4,730,909 A * | 3/1988 | Takahashi | ..................... | 359/735 |
| 4,815,833 A * | 3/1989 | Zobel et al. | ................... | 359/726 |
| 5,331,467 A * | 7/1994 | Sato | ............................. | 359/731 |
| 5,912,764 A * | 6/1999 | Togino | ......................... | 359/367 |
| 7,101,334 B2 * | 9/2006 | Takahashi | ..................... | 600/166 |
| 7,408,703 B2 * | 8/2008 | Matsuki et al. | ................ | 359/365 |
| 2004/0254424 A1 | 12/2004 | Simkulet et al. | | |

FOREIGN PATENT DOCUMENTS

| | | |
|---|---|---|
| JP | 06-308381 | 11/1994 |
| JP | 2000-271068 | 10/2000 |
| JP | 2000-322564 A | 11/2000 |
| JP | 2002-033943 A | 1/2002 |
| JP | 2002-523801 | 7/2002 |
| JP | 2006-113096 | 4/2006 |
| WO | WO 03/042743 | 5/2003 |
| WO | WO 2005/110186 | 11/2005 |

* cited by examiner

*Primary Examiner* — Ricky D Shafer
(74) *Attorney, Agent, or Firm* — Pillsbury Winthrop Shaw Pittman, LLP

(57) ABSTRACT

An observation optical system has a negative lens unit placed at the most object-side position; an annular prism placed on the image side of the negative lens, having a reflecting surface on the negative lens side; and an imaging lens unit arranged on the image side of the negative lens and the annular prism.

12 Claims, 3 Drawing Sheets

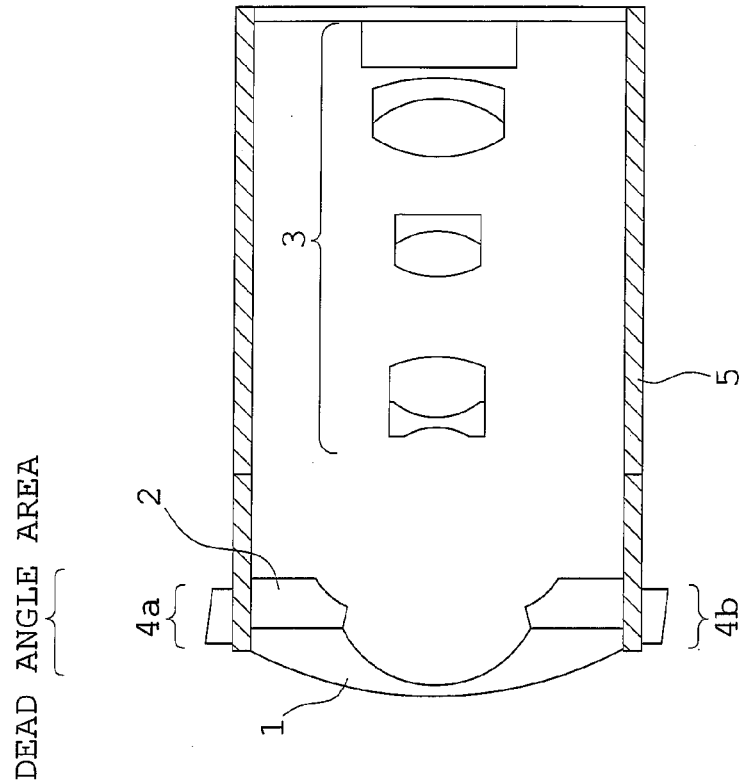
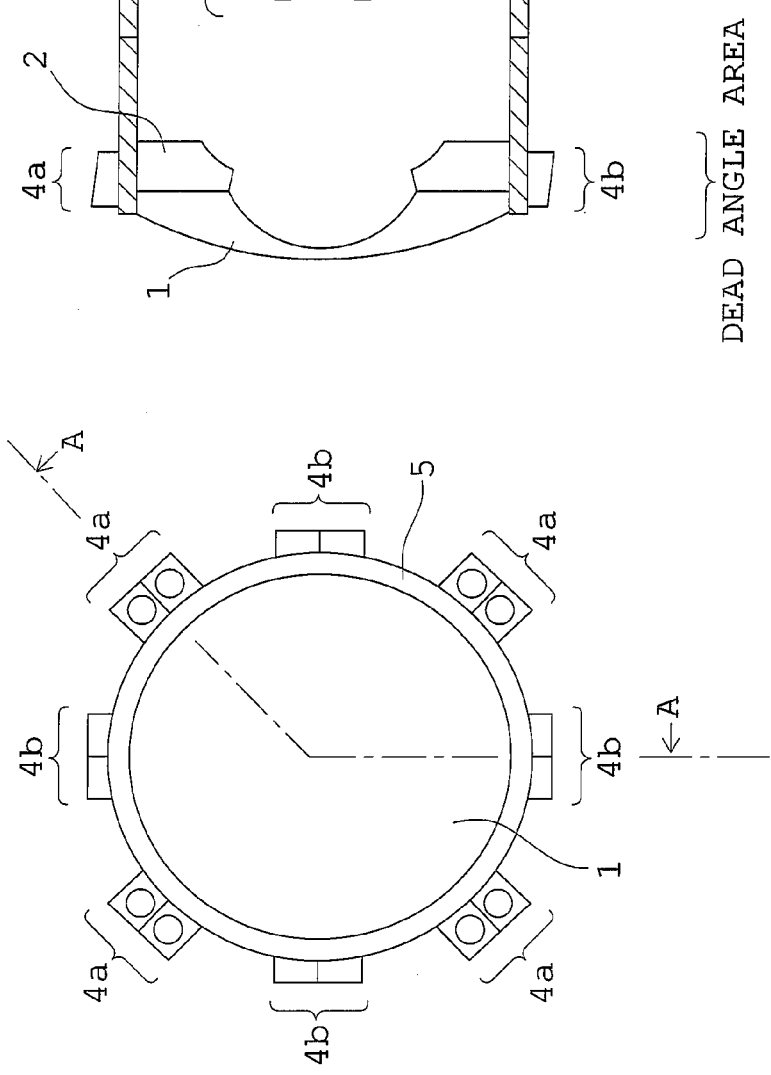
FIG. 3A
FIG. 3B

OBSERVATION OPTICAL SYSTEM

This application claims benefits of Japanese Patent Application No. 2007-101803 filed in Japan on Apr. 9, 2007, the contents of which are incorporated herein by reference.

BACKGROUND OF THE INVENTION

1. Field of the Invention

This invention relates to an observation optical system, and in particular, to an observation optical system in which an ordinary forward observation is made and at the same time, a backward observation can also be made.

2. Description of Related Art

As conventional observation optical systems in which the forward observation and the backward observation can be made at the same time, optical systems set forth, for example, in Japanese Patent Kokai Nos. 2002-33943 and 2000-322564 are available.

The optical system set forth in Kokai No. 2002-33943 is related to an omnidirectional visual sensor. This optical system includes a rotating mirror and a wide-angle lens. The rotating mirror directs a convex surface toward the image pickup side and has a notch at its center. The wide-angle lens is provided in the notch of the rotating mirror. It is possible to image a front visual field through the wide-angle lens and an ambient visual field including a rear visual field through the rotating mirror by using a common image pickup means.

The optical system set forth in Kokai No. 2000-322564, like the optical system of Kokai No. 2002-33943, is related to an omnidirectional visual sensor. This optical system includes a wide-angle lens and a curved-surface-shaped reflecting mirror. The wide-angle lens is provided to image visual information in horizontal and upward directions. The curved-surface-shaped reflecting mirror is placed at the lower portion (on the image pickup side) of the wide-angle lens and is used to image visual information in horizontal and downward directions. The visual information obtained through the wide-angle lens and the curved-surface-shaped reflecting mirror is imaged using the common image pickup means.

SUMMARY OF THE INVENTION

The observation optical system according to the present invention comprises a negative lens placed at the most object-side position; an annular prism placed on the image side of the negative lens, having a reflecting surface on the negative lens side; and an imaging lens unit arranged on the image side of the negative lens and the annular prism.

In the observation optical system of the present invention, it is desirable that when an optical system including the negative lens and the imaging lens unit is taken as a forward observation optical system and an optical system including the annular prism and the imaging lens unit is taken as a backward observation optical system, an image produced by the backward observation optical system and an image produced by the forward observation optical system are formed at different positions on an imaging plane.

In the observation optical system of the present invention, it is desirable that the negative lens and the annular prism are cemented.

In the observation optical system of the present invention, it is desirable that an area in which a dead angle is formed with respect to both the negative lens and the annular prism is provided on the side of the negative lens and the annular prism so that an illumination means can be placed in the area in which the dead angle is formed.

In the observation optical system of the present invention, it is desirable that the forward observation optical system and the backward observation optical system have an aperture stop common to each other.

It is desirable that the observation optical system of the present invention is used in an endoscope.

These and other features and advantages of the present invention will become apparent from the following detailed description of the preferred embodiments when taken in conjunction with the accompanying drawings.

BRIEF DESCRIPTION OF THE DRAWINGS

FIGS. 3A and 3B are explanatory views showing the arrangement of an observation optical system and an illumination optical system at the distal end of the endoscope apparatus of FIG. 2, indicating a front view and a sectional view taken along line A-A in FIG. 3A, respectively.

DETAILED DESCRIPTION OF THE PREFERRED EMBODIMENT

Figure 1:
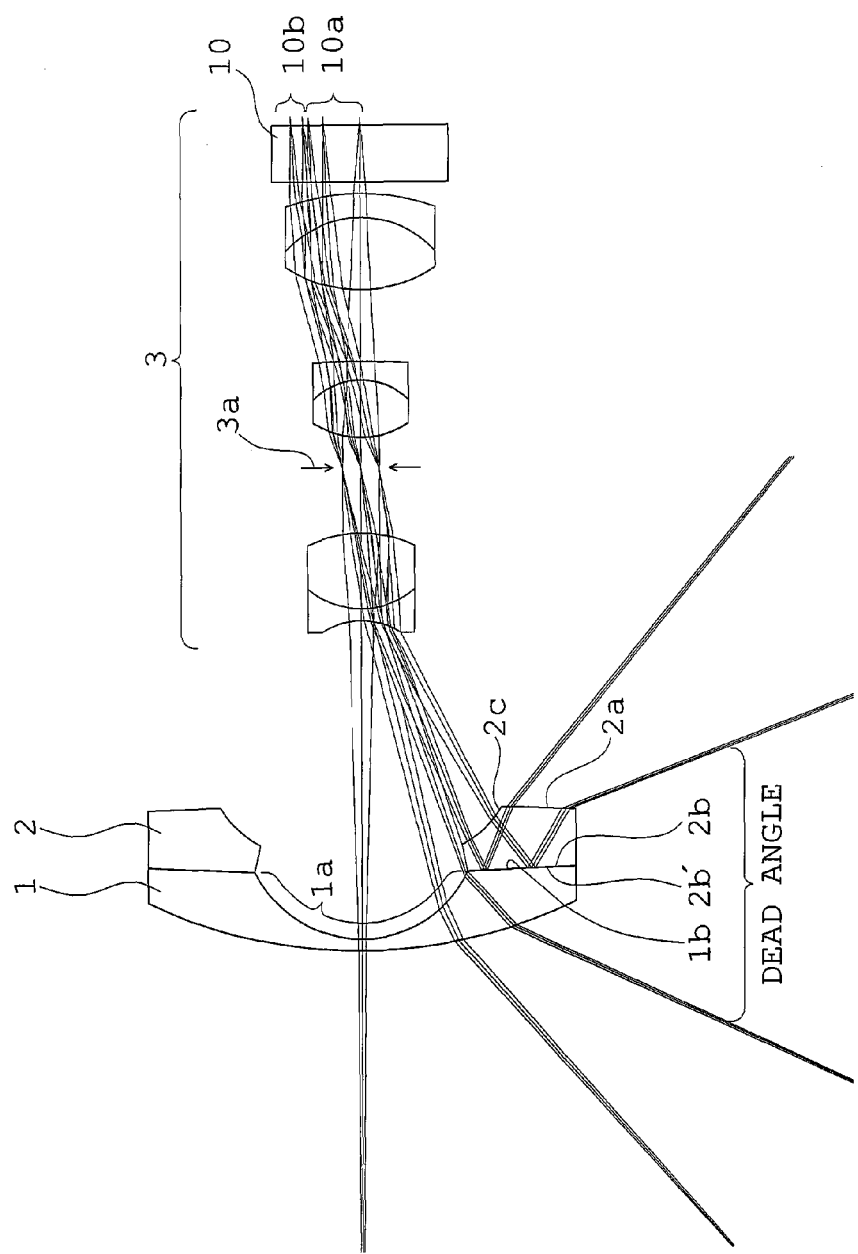
FIG. 1 is an explanatory view showing a schematic arrangement of the observation optical system according to one embodiment of the present invention.
Figure 2:
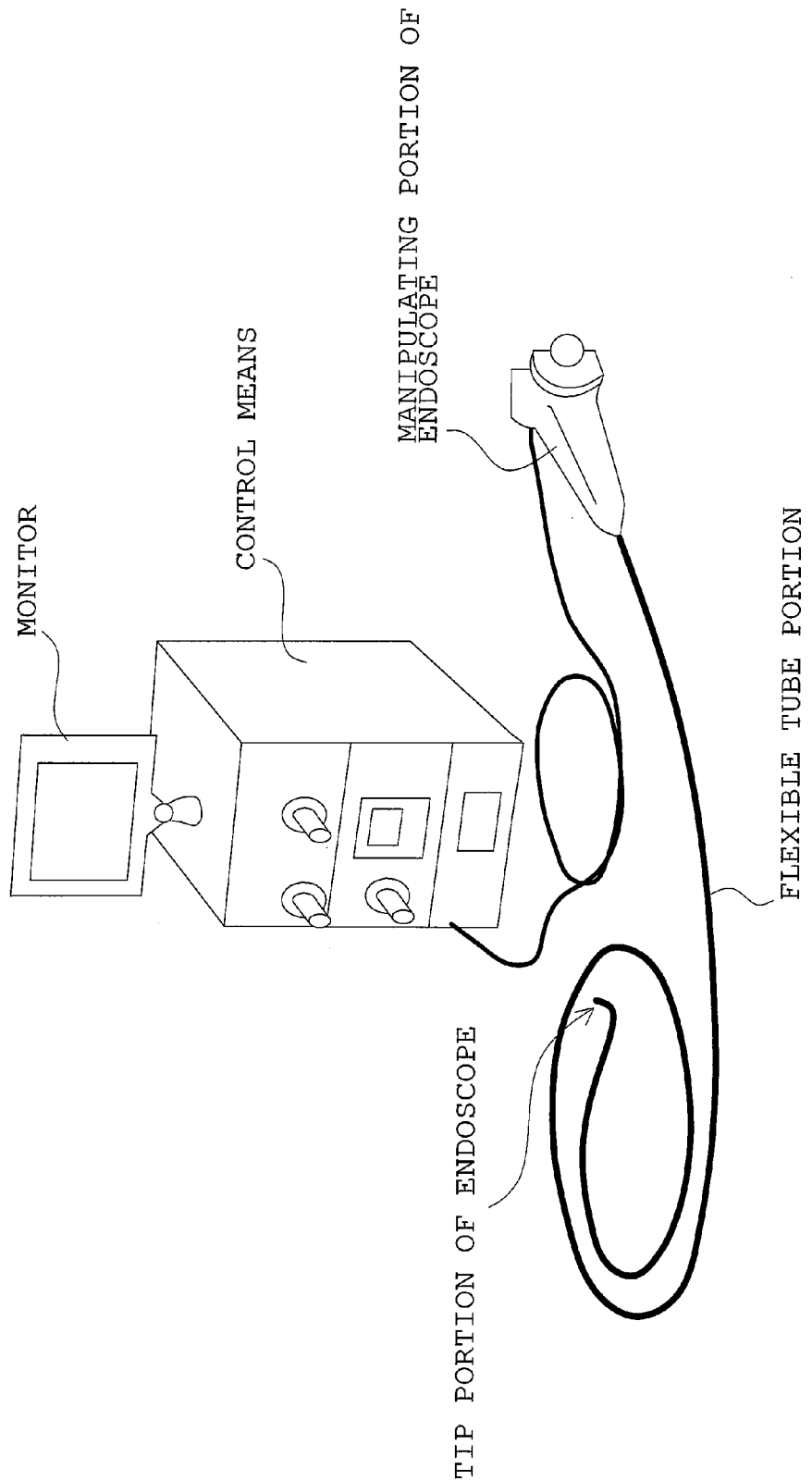
FIG. 2 is a general view showing an endoscope apparatus provided with the observation optical system of FIG. 1.

FIG. 1 shows a schematic arrangement of the observation optical system according to one embodiment of the present invention; FIG. 2 shows an endoscope apparatus provided with the observation optical system of FIG. 1; and FIGS. 3A and 3B shows the arrangement of an observation optical system and an illumination optical system at the distal end of the endoscope apparatus of FIG. 2.

The observation optical system of the embodiment is an endoscope observation optical system provided at the distal end of an endoscope shown in FIG. 2 and, as shown in FIG. 1, is constructed to have, in order from the object side, a negative lens 1, an annular prism 2, and an imaging lens unit 3. Also, in FIG. 1, reference numeral 10 denotes an imaging plane, at which the image pickup surface of an image sensor is placed in the embodiment. The negative lens 1 is placed at the most object-side position. The negative lens 1 is such as to transmit incident light from a front visual field and to make divergent light emerge toward the imaging lens unit 3.

Here, it is desirable that, of incident light which enters the negative lens 1 from the front visual field and passes through an aperture stop $3a$, a light ray of the maximum field angle is not incident on the annular prism 2. The annular prism 2 has an entrance surface $2a$, a reflecting surface $2b$, and an exit surface $2c$. A mirror coating $2b'$ is applied to the reflecting surface $2b$. The annular prism 2 is placed on the image side of the negative lens 1 in such a way that the reflecting surface $2b$ is located on the negative lens 1 side. In the annular prism 2, individual surfaces are designed so that light incident on the entrance surface $2a$ from the rear visual field is reflected by the reflecting surface $2b$ and reflected light emerges from the exit surface $2c$ toward the imaging lens unit 3. Also, it is desirable that the exit surface $2c$ is configured as a curved surface. Furthermore, the exit surface $2c$ may be configured as a free-formed surface.

In the observation optical system of the embodiment, the negative lens 1 and the annular prism 2 are cemented. Specifically, an outside surface $1b$ of the negative lens 1 and the reflecting surface $2b$ of the annular prism 2 are cemented, with the mirror coating $2b'$ between them.

The imaging lens unit 3 has an outside diameter (an effective diameter) through which light passing through the negative lens 1 and light reflected by the reflecting surface 2b are both passed. The imaging lens unit 3 is constructed so that light from the front visual field leaving the negative lens 1 is imaged at a middle 10a of the imaging plane 10 and light from the rear visual field reflected by the reflecting surface 2b of the annular prism 2 and leaving the annular prism 2 is imaged on a periphery 10b of the imaging plane 10. In this way, the observation optical system of the embodiment is such that the forward observation optical system is constructed with the negative lens 1 and the imaging lens unit 3 and the backward observation optical system is constructed with the annular prism 2 and the imaging lens unit 3. In addition, the imaging lens unit 3 has the aperture stop 3a common to the forward observation optical system and the backward observation optical system.

According to the observation optical system of the embodiment constructed as mentioned above, the light from the front visual field is incident on the negative lens 1, and the light leaving a lens surface la is incident on the imaging lens unit 3 and is imaged through the imaging lens unit 3 at the middle 10a of the imaging plane 10. At the same time, the light from the rear visual field is incident on the entrance surface 2a of the annular prism 2, and after being reflected by the reflecting surface 2b and leaving the exit surface 2c, is imaged through the imaging lens unit 3 on the periphery 10b of the imaging plane 10. Whereby, the front visual field and the rear visual field can be observed at the same time.

The observation optical system of the embodiment, as described above, is provided with the forward observation optical system and the backward observation optical system. Consequently, for example, in an endoscope field in which the interior of the large intestine is observed, the observation of the so-called behind folds is carried out. Specifically, the oversight of a lesion part of the behind folds can be lessened. In particular, the developments in recent years of high-vision image quality and NBI (special wavelength observation) have rendered the detection of early cancers possible. A combination with such techniques facilitates the detection of the lesion part of the behind folds (early cancer).

According to the observation optical system of the embodiment, in the observation of the front visual field, light passes through only the negative lens unit 1 on the object side of the imaging lens unit 3. On the other hand, in the observation of the rear visual field, light passes through only the annular prism 2 on the object side of the imaging lens unit 3. Here, in the annular prism 2, at least, the exit surface 2c is configured as the curved surface. Hence, the entrance surface 2a and the exit surface 2c constitute a refracting lens (a refracting optical system). Specifically, light passing through only the annular prism 2 is subjected to not only a reflecting action due to the reflecting surface, but also a refracting action due to the lens entrance surface 2a and the exit surface 2c. Consequently, chromatic aberration of magnification can be produced by light leaving the annular prism 2 as well as by light leaving the negative lens 1. Moreover, by properly setting the shapes of the lens entrance surface 2a and the exit surface 2c, the amount of chromatic aberration of magnification produced by the light leaving the annular prism 2 can be practically equalized to that of chromatic aberration of magnification produced by the light leaving the negative lens 1. In this way, chromatic aberrations of magnification produced by both the negative lens 1 and the annular prism 2 through the imaging lens unit 3 can be favorably corrected at the same time.

According to the observation optical system of the embodiment, therefore, in the forward and backward observations of the visual fields, the observations of favorable images or favorable pictures can be obtained at the same time. Consequently, when the observation optical system is used, for example, for a conventional endoscope observation, notably for the endoscope observation of the interior of the large intestine, the oversight of the lesion part of the behind folds can be considerably lessened.

In the observation optical system of the embodiment, the negative lens 1 and the annular prism 2 are cemented. Here, the negative lens 1 and the annular prism 2 may be basically separately arranged. However, as the annular prism 2 is moved away from the negative lens 1, the annular prism 2 approaches the imaging lens unit 3. In this case, reflected light from the annular prism 2 is made incident on the imaging lens unit 3 at a short distance, and thus aberrations become liable to deteriorate. When an attempt is made to move the imaging lens unit 3 farther away from the annular prism 2 in order to avoid this problem, a distance between the negative lens 1 and the imaging lens unit 3 increases. In this case, since a light beam emerging from the negative lens 1 is spread, the optical system becomes bulky.

From the above description, it is desirable to cement the negative lens 1 and the annular prism 2. By doing so, the spread of the light beam diverging from the negative lens 1 can be suppressed. Whereby, the diameter of the annular prism 2 located on the image side of the negative lens 1 can be made small. Moreover, the outside diameter of the imaging lens unit 3 can also be made small. As a result, the diameter of the entire observation optical system can be reduced.

Further, in the observation optical system of the embodiment, an area in which a dead angle is formed is provided between a forward observation range and a backward observation range. The negative lens 1, the annular prism 2, and the imaging lens unit 3 are designed so that such a dead angle is formed. The area of this dead angle can be formed, for example, in a direction perpendicular to the optical axis and on the side of the negative lens 1 and the annular prism 2. It is desirable that an illumination light source is placed in the area of the dead angle. The illumination light source may be provided independently for each of the forward observation and the backward observation. Alternatively, a light source common to both the forward observation and the backward observation may be provided. In this way, oversizing of the entire observation apparatus can be suppressed. In particular, the effect of suppressing oversizing as far as possible is prominent in the observation apparatus such as the endoscope.

An example where the illumination light source is placed in the area of the dead angle of the observation optical system of the embodiment is shown in FIGS. 3A and 3B.

In the example of FIGS. 3A and 3B, the area of the dead angle of the observation optical system is formed on a direction perpendicular to the optical axis and on the side of the negative lens 1 and the annular prism 2. An illumination light source 4 is constructed so that LED blocks 4a for forward illumination and LED blocks 4b for backward illumination, four for each illumination, are alternately provided in the area of the dead angle. Also, in FIG. 3B, reference numeral 5 denotes the housing of the distal end of the endoscope.

According to the observation optical system of the embodiment, the imaging lens unit 3 has the aperture stop 3a common to the forward observation optical system and the backward observation optical system. Hence, the number of members for adjusting the amount of light in the forward observation and the backward observation can be reduced and a compacter design of the entire observation optical system can be achieved. In the observation optical system of the embodiment, the exit surface 2c of the annular prism 2 is configured as a concave surface with curvature and an observation magnification can be brought to a desired magnification by providing a desired curvature so that a backward observation image can be observed at the same magnification as a forward observation image. Furthermore, in this case, when the exit surface 2c of the annular prism 2 is configured as a free-formed surface, the thickness of the annular prism 2 can be made smaller and a compacter design of the entire observation optical system can be achieved.

Also, although the embodiment has been described by using an example of an ordinary endoscope observation optical system, the observation optical system of the present invention is applicable to a capsule endoscope as well. The observation optical system of the present invention is not limited to the endoscope observation optical system, but it is also applicable to observation optical systems used in other applications excluding the endoscope observation.

According to the observation optical system of the embodiment, chromatic aberrations of magnification in both the forward observation and the backward observation can be favorably corrected at the same time. As a result, in the forward and backward observations of the visual fields, the observation optical system which is capable of obtaining the observations of images in which chromatic aberrations are favorably corrected or pictures is acquired.

The observation optical system of the embodiment is useful in the field in which it is needed that the front and rear visual fields are observed with a high degree of accuracy at the same time, particularly in the endoscope observation of the interior of the large intestine.

What is claimed is:

1. An observation optical system comprising:
   a negative lens, which is placed at a most object-side position;
   an annular prism which is placed on at a more image-side position than the negative lens, the annular prism having a reflecting surface that is arranged on a negative-lens side of the annular prism and that faces toward the image side position; and
   an imaging lens unit arranged at a more image-side position than the negative lens and the annular prism,
   wherein the negative lens and the imaging lens unit form a forward observation optical system and the annular prism and the imaging lens unit form a backward observation optical system, and an image produced by the backward observation optical system and an image produced by the forward observation optical system are formed at different positions on an imaging plane, and
   wherein the forward observation optical system and the backward observation optical system have an aperture stop common to each other.

2. The observation optical system according to claim 1, wherein the negative lens and the annular prism are cemented.

3. The observation optical system according to claim 2, used in an endoscope.

4. The observation optical system according to claim 1, wherein a region that forms a blind spot with respect to both the negative lens and the annular prism is generated around a lateral portion of the negative lens and the annular prism, and an illumination means is placed in the blind spot.

5. The observation optical system according to claim 4, used in an endoscope.

6. The observation optical system according to claim 1, used in an endoscope.

7. The observation optical system according to claim 1, wherein the annular prism is hollowed so that a bundle of rays passing through the negative lens is not incident on the annular prism.

8. The observation optical system according to claim 1, wherein the negative lens and the annular prism are constructed and arranged so that a bundle of rays passing through the negative lens is directly incident on the imaging lens unit.

9. The observation optical system according to claim 1, wherein there is no optical member other than the annular prism arranged between the negative lens and the imaging lens unit.

10. The observation optical system according to claim 1, wherein the annular prism is arranged to reflect a bundle of rays incident thereon only once.

11. The observation optical system according to claim 1, wherein the annular prism further comprises a first refracting surface and a second refracting surface; and the reflecting surface, the first refracting surface, and the second refracting surface are configured in the annular prism so that a bundle of rays entering the annular prism through the first refracting surface is then reflected at the reflecting surface and emerges from the second refracting surface.

12. An observation optical system comprising:
   a negative lens, which is placed at a most object-side position;
   an annular prism which is placed at a more image-side position than the negative lens, the annular prism having a reflecting surface that is arranged on a negative-lens side of the annular prism and that faces toward the image side position; and
   an imaging lens unit arranged at a more image-side position than the negative lens and the annular prism,
   wherein the negative lens and the imaging lens unit form a forward observation optical system and the annular prism and the imaging lens unit form a backward observation optical system, and an image produced by the backward observation optical system and an image produced by the forward observation optical system are formed at different positions on an imaging plane, and
   wherein the observation optical system is used in an endoscope.

* * * * *